United States Patent
Liu et al.

(10) Patent No.: US 9,542,965 B2
(45) Date of Patent: Jan. 10, 2017

(54) SKEWED SHINGLED MAGNETIC RECORDING DATA READER

(71) Applicant: Seagate Technology LLC, Cupertino, CA (US)

(72) Inventors: Xiong Liu, Singapore (SG); Lihong Zhang, Singapore (SG)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/677,055

(22) Filed: Apr. 2, 2015

(65) Prior Publication Data

US 2016/0293190 A1     Oct. 6, 2016

(51) Int. Cl.
*G11B 5/56* (2006.01)
*G11B 20/12* (2006.01)

(52) U.S. Cl.
CPC .............. *G11B 5/56* (2013.01); *G11B 20/1217* (2013.01); *G11B 2020/1238* (2013.01); *G11B 2020/1292* (2013.01)

(58) Field of Classification Search
None
See application file for complete search history.

(56) References Cited

U.S. PATENT DOCUMENTS

| | | | |
|---|---|---|---|
| 6,437,947 B1* | 8/2002 | Uno | G11B 5/012 360/75 |
| 7,486,460 B2* | 2/2009 | Tsuchinaga | G11B 5/012 360/48 |
| 7,490,212 B2 | 2/2009 | Kasiraj et al. | |
| 8,134,802 B2 | 3/2012 | Bai et al. | |
| 8,310,786 B2 | 11/2012 | de la Fuente et al. | |
| 8,462,468 B2 | 6/2013 | Katada et al. | |
| 8,792,210 B2 | 7/2014 | de la Fuente et al. | |
| 8,861,114 B1* | 10/2014 | Burd | G11B 5/012 360/45 |
| 8,867,161 B2* | 10/2014 | Emo | 360/58 |
| 8,896,961 B1 | 11/2014 | Harllee, III | |
| 2014/0340786 A1 | 11/2014 | Xu et al. | |

* cited by examiner

*Primary Examiner* — K. Wong
(74) *Attorney, Agent, or Firm* — Hall Estill Attorneys at Law

(57) ABSTRACT

A data storage device may be configured with at least a transducing head separated from a data storage medium. The transducing head can have a data reader and data writer. A plurality of data bits may be arranged in first and second shingled data tracks on the data storage medium. The data writer can be configured with a writer centerline aligned with a track centerline of the first shingled data track and a data reader having a reader centerline skewed with respect to the track and writer centerlines.

20 Claims, 3 Drawing Sheets

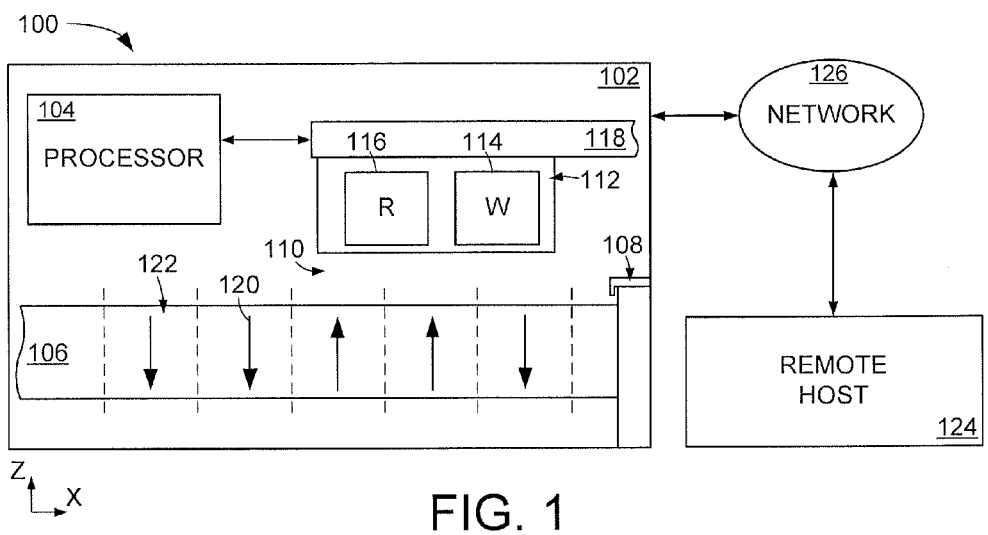
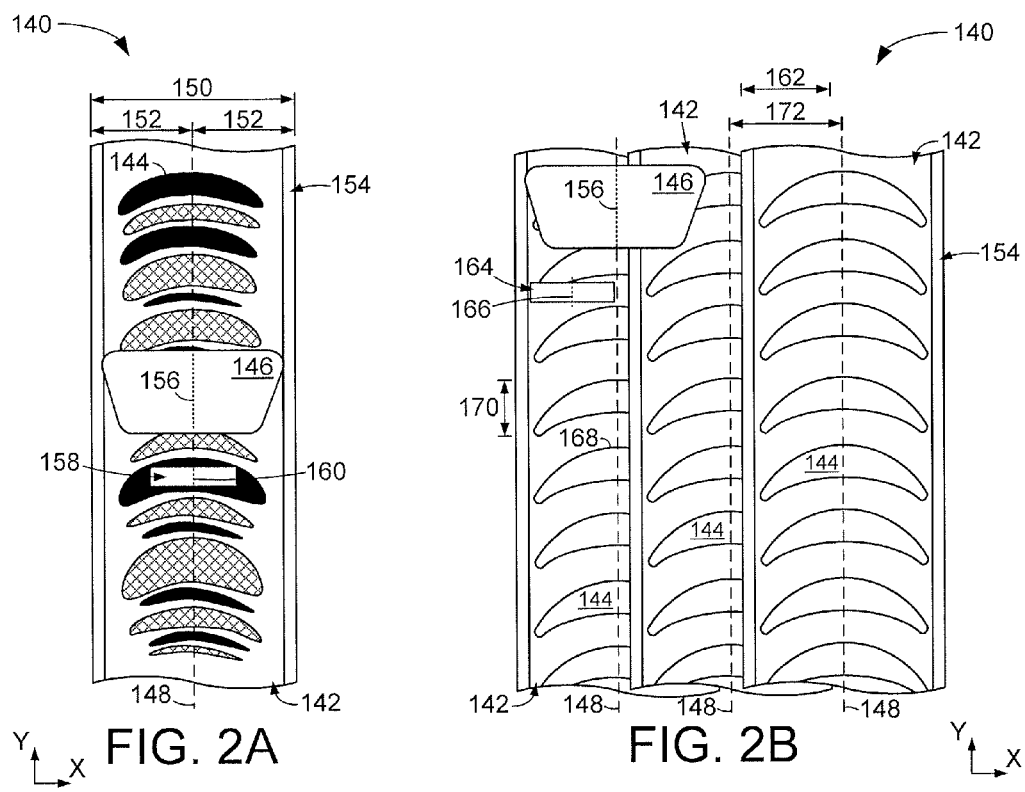

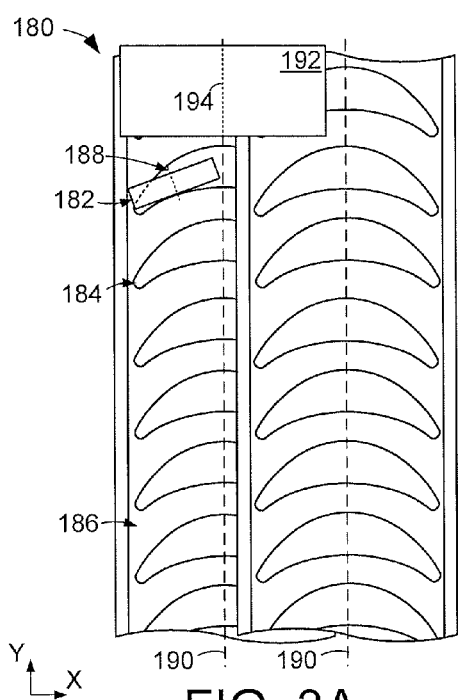
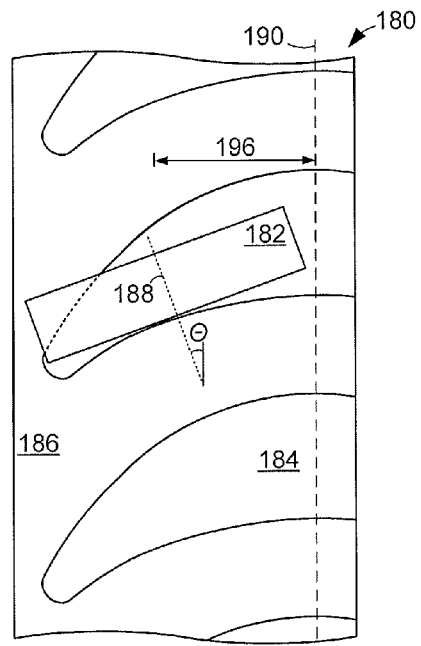
FIG. 3A
FIG. 3B
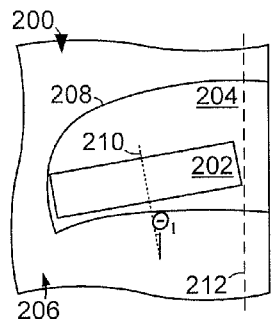
FIG. 4A
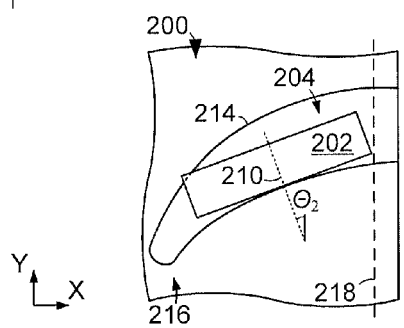
FIG. 4B
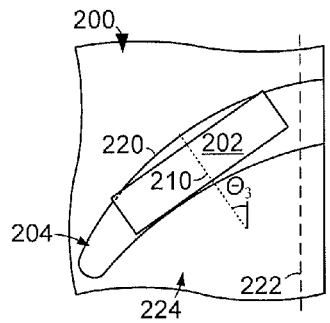
FIG. 4C

SKEWED SHINGLED MAGNETIC RECORDING DATA READER

SUMMARY

In accordance with assorted embodiments, a data storage device has a transducing head separated from a data storage medium. The transducing head has a data reader and data writer. A plurality of data bits are arranged in first and second shingled data tracks on the data storage medium. The data writer is configured with a writer centerline aligned with a track centerline of the first shingled data track and a data reader having a reader centerline skewed with respect to the track and writer centerlines.

BRIEF DESCRIPTION OF THE DRAWINGS

FIG. 1 is a line representation of a portion of an example data storage system constructed and operated in accordance with some embodiments.

FIGS. 2A and 2B respectively display line representations of portions of an example data storage device configured in accordance with various embodiments.

FIGS. 3A and 3B respective show portions of an example data storage device arranged in accordance with assorted embodiments.

FIGS. 4A-4C respectively display line representations of portions of an example data storage device configured in accordance with some embodiments.

DETAILED DESCRIPTION

Figure 5:
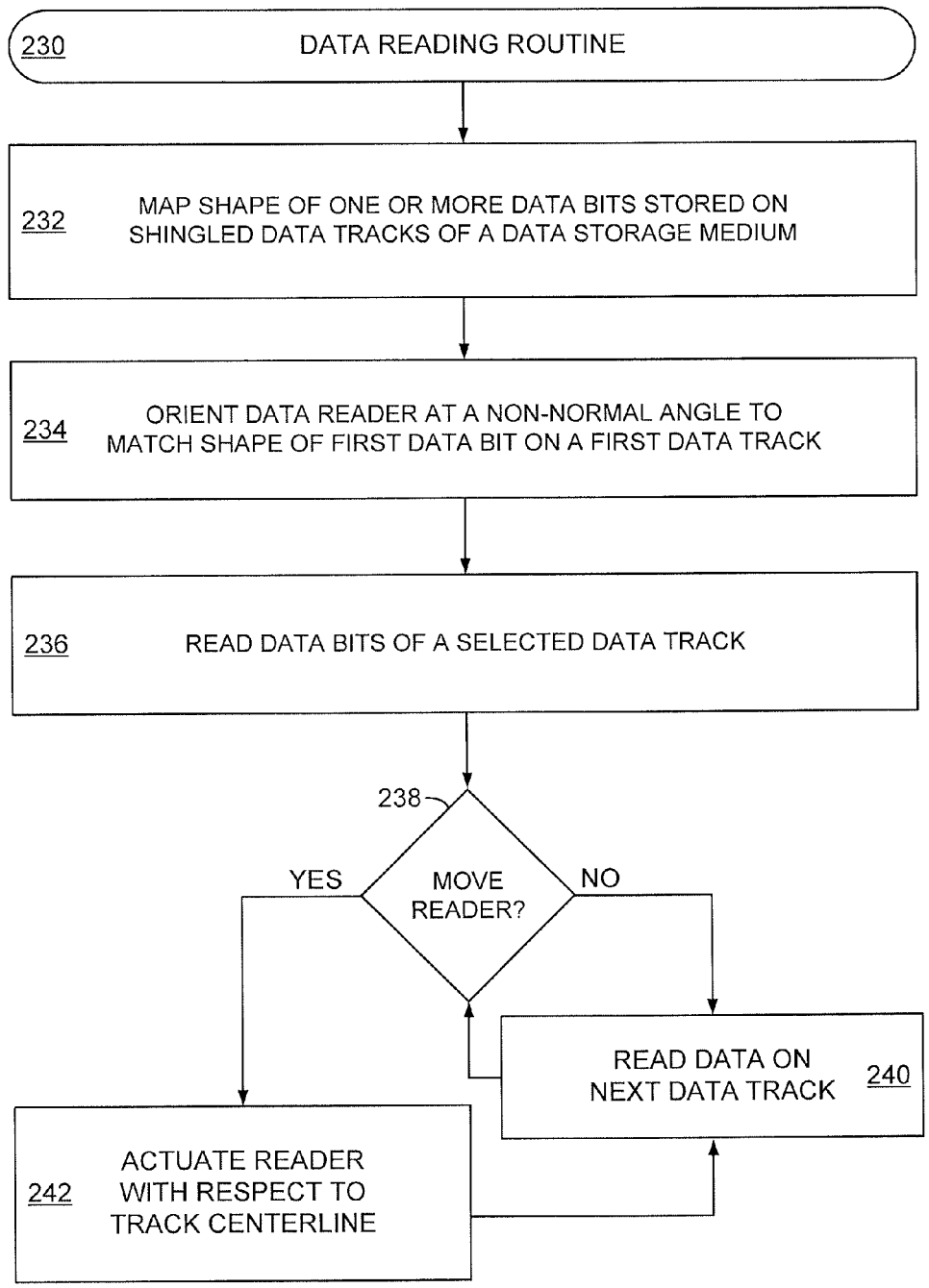
FIG. 5 plots an example data reading routine carried out in accordance with some embodiments.

In an effort to increase the data capacity of a data storage device, data is more densely positioned on a data storage medium. The decrease of transition zone between data bits and bit size can degrade the signal-to-noise (SNR) ratio of the data storage device as adjacent data is inadvertently read and the physically smaller data bits are more difficult to detect. A continued industry goal is to provide data storage devices with high data density while at the same time a sustainable SNR to provide optimized performance.

It is contemplated that data can be arranged on a data storage medium in data tracks that do not overlap. However, assorted embodiments increase the data capacity and data bit density of a data storage medium by overlapping data tracks in what can be characterized as shingled magnetic recording. The utilization of shingled data tracks can increase data capacity, but reduces the exposed size of a data bit, which decreases SNR.

Accordingly, a data storage device can have a transducing head with a data reader and data writer along with a plurality of data bits arranged in first and second shingled data tracks on a data storage medium. Configuring the data writer with a writer centerline aligned with a track centerline of the first shingled data track and a data reader with a reader centerline skewed with respect to the track and writer centerlines allows the data reader to be better positioned with respect to the underlying shingled data bit to provide a high SNR. The ability to tune the position and orientation of the data reader with respect to a data bit and the data writer allows the data storage device to accommodate varying data bit sizes and shingled data track positions to provide optimized data reading performance.

Although not required or limiting, an example data storage system 100 is shown in FIG. 1 that can employ a tuned data storage device 102 in accordance with various embodiments. It is noted that the data storage system 100 can have more than one data storage devices 102 that have similar or dissimilar configurations, such as data type, capacity, speed, and physical size. As shown in FIG. 1, a rotating hard disk drive data storage device 102 is connected to and controlled by a local processor 104, such as a microprocessor or application specific integrated circuit (ASIC). It is noted that at least one solid-state data storage device, or buffer, may concurrently be connected to the processor 104 to supply temporary and/or permanent data storage capabilities.

The data storage device 102 may be configured with any number of data storage media 106 that rotate via a central spindle 108 to create an air bearing 110 on which a transducing head 112 flies to conduct data access operations. The transducing head 112 can incorporate any number of computing components, such as a data writer 114 and reader 116, that are actuated via a suspension 118, such as a gimbal. It is contemplated that the transducing head 112 and assembly may consist of other components, like microactuators, heaters, contact detection sensors, slider body, and electrical interconnects, that facilitate positioning of the data writer 114 and reader 116 elements over data bits and data tracks on the data storage medium 106 to read and write data bits 120 individually and collectively to one or more data tracks 122.

The data storage device 102 can be connected to one or more remote hosts 124, such as a node, server, and processor, via a wired or wireless network 126. The continuous, sporadic, routine, or random connection to at least one remote host 124 allows the data storage device to perform efficiently as with greater capabilities as the remote host(s) 124 provide additional data storage, data generation, control, and organization. Despite increased capabilities, the data capacity of the data storage device 102 is defined by the number of data bits 120 stored on the data storage medium 106.

FIGS. 2A and 2B respectively illustrate line representations of portions of an example data storage medium 140 that can be utilized in the data storage system 100 of FIG. 1 in accordance with some embodiments. In the top view of FIG. 2A, a portion of a data track 142 stores a plurality of separated data bits 144 having differing magnetic polarities, as respectively designated by solid and cross-hatched interiors.

The respective data bits 144 can be written by a data writer 146 in uniform or varying shapes with any pattern, such as 1T, 2T, or 3T pattern where T is a time interval of one data bit 144. If a 1T pattern is written, the data bits 144 with have a uniform pattern and there will be a transition zone between each data bit 144 that is part of the time interval. In the event a 2T pattern is written, a uniform data bit pattern is also experiences, but without transition zones between adjacent positive, or negative, data bits 144. Hence, the 2T pattern shape is double that of a 1T pattern. With user data, the data pattern is mixed randomly and so does the written data pattern. Thus, the data writer 146 can write a particular magnetic polarity with a shape that can be the same for each magnetic polarity, or be different depending on the magnetic polarity, speed of data writing, type of data writing scheme, and series of data previously recorded.

The data track 142 in FIG. 2A has a track centerline 148 that is substantially in the middle of a track width 150, as measured along the X axis in what can be characterized as the cross-track direction. The track centerline's 148 position can be defined by being equidistant 152 between cross-track boundaries of the data track 142. The data track 142 may also have a predetermined margin 154 where no data is programmed in order to buffer the data bits 144 from adjacent data tracks.

It is noted that the data bits 144 are substantially centered in the data track 142 and symmetric about the track centerline 148 due to a writer centerline 156 being aligned with and parallel to the track centerline 148. However, data bits 144 may be asymmetric, as shown, due to one or more data writing conditions and process variations during data writer 146 fabrication. Hence, the data bits 144 can be designed as symmetric shapes about the track centerline 148, but may be written as asymmetric variations of the designed shape.

The writer centerline 156 is positioned along a transverse axis of the data writer and parallel to the Y axis and downtrack direction. With the data bits 144 being fully exposed, the data reader 158 can provide ample SNR by being positioned with a reader centerline 160, which extends through a transverse axis of the reader 158, aligned with the track centerline 148. While positioning the reader 160 and writer 156 centerlines aligned with the track centerline 148 can provide acceptable performance in some circumstances, such arrangement corresponds with degraded performance in shingled magnetic recording environments, as illustrated in FIG. 2B.

It can be appreciated that the data tracks 142 overlap by a predetermined distance 162 increases the data bit density and data storage device capacity, but reduces the exposed surface area of the respective data bits 144. Hence, aligning the data reader 158 with the respective track centerlines 148 during operation would not provide acceptable SNR due to less than all the reader 160 being exposed to the data bit 144. Thus, various embodiments offset a data reader 164 with respect to the track centerline 148.

By positioning the reader centerline 166 parallel and separated from the track centerline 148, more of the data reader 164 is exposed to the portion of the data bits 144 that are not covered by the adjacent, shingled data track 142. However, the offset and parallel position of the reader centerline 166 relative to the track centerline 148 may not provide optimized SNR due to the shape of the respective data bits 144. That is, the continuously curvilinear boundary 168 and decreasing thickness 170 away from the track centerline 148, along a cross-track direction parallel to the X axis, can be difficult to read with high SNR when the reader centerline 166 is parallel to the track centerline 148.

It can be appreciated that a difference between conventional magnetic recording (CMR) and shingled magnetic recording (SMR) is the offset position of the reader centerline 166 from the track centerline 148. The reader offset is measured according to the best SNR, but may be approximated by equation 1, as follows:

$$\text{Offset} = \frac{WPE - TP}{2} \qquad \text{Equation 1}$$

where WPE is the write plus erasure distance 150 and TP is the track pitch distance 172 between track centerlines 148. It is noted that each data track may comprise continuous magnetic material that can be magnetized into the data bits 144 by the data writer 146. That is, there may be no magnetic gap between the respective data bits 144, but instead a transition zone between negative and positively magnetized bits 144 where the magnetic field becomes very weak due to the switching of the data writer 146 between magnetic polarities.

It is noted that while the shingled data tracks 142 are shown in FIG. 2B as continuously overlapping, such a configuration is not required or limiting. For example, a first plurality of shingled data tracks 142 can be separated from a second plurality of shingled data tracks 142 by a guardband that interrupts the overlapping of adjacent data tracks 142. The guardband may be any size and can separate any number of shingled tracks into continuously overlapping groups.

FIGS. 3A and 3B respectively illustrate line representations of portions of an example data storage device 180 configured in accordance with various embodiments to match the orientation of a data reader 182 with the exposed shape of a data bit 184. The shingled arrangement of the data tracks 186 shown in FIG. 3A can reduce the amount of magnetic data bits grains exposed to the data reader 182. By skewing the data reader 182 orientation, as defined by the canted position of the reader centerline 188 which extends through a symmetric center of the data reader 182, by a predetermined angle Θ with respect to the data track centerline 190, more of the grains of the data bit 184 can be concurrently sensed by the data reader 182.

While the data reader 182 is shown in a canted orientation, it is contemplated that the data writer 192 is skewed with respect to the track centerline 190. That is, the writer centerline 194, which is shown aligned with the track centerline 190, can be angled to a non-normal orientation with respect to the data track 186 and track centerline 190. The ability to skew the data reader 182 and data writer 192 to matching, or dissimilar, angles with respect to the data bits 184 and track centerline 190 allows the shape of the data bits 184 to be tuned for shingled recording and increased SNR with the skewed data reader configuration.

FIG. 3B displays how the skewed angle Θ of the data reader 182 matches the shape of the underlying data bit 184. The symmetric shape of the data reader 182 about the reader centerline 188 is not required or limiting, but results in a majority of the data reader 182, such as 80% of the reader air bearing surface area, being simultaneously positioned over magnetic portions of the data bit 184.

In various embodiments, the data reader 182 is suspended by an actuating assembly that allows for articulation of the skewed angle Θ and/or reader centerline distance 196 from the track centerline 190 with separate actuating means. That is, the data reader 182 can be connected to a first actuating means, such as a heater, that can change the orientation of the data reader 182 relative to the underlying data bits 184 while the data bits 184 are being read and the transducing head comprising the data reader 182 and writer 192 may be articulated by a second actuating means. As such, the reader angle Θ can be pre-designed and manufactured during transducing head design according to a given data writer 192 design and the actuating means can be used to fine-tune the reader angle Θ according to a given transducing head and data track 186 configuration.

The ability to perform on-the-fly adjustments of the data reader's position and angle Θ with respect to the track centerline 190 allows local and/or remote controllers to optimize data reading performance by accommodating different data bit shapes and varying skew angles of the data reader 182 with respect to the data storage medium. As a non-limiting example, the angle Θ can be pre-determined during data storage device certification test for different track radius based on the maximum areal density capability (ADC). By determining the angle of some selected tracks from the outer radius to inner radius of the data storage medium, we can use establish a transfer function between track and reader angle or power of the actuation heater by using curve-fit. During actual data storage device operation, the device can determine the reader angle Θ for specific tracks based on the established transfer function in response to the predicted or measured configuration of the specific tracks.

FIGS. 4A-4C respectively display line representations of portions of an example data storage device 200 with a data reader 202 matching different data bit 204 shapes in accordance with some embodiments. The data bits 204 are arranged in different shingled data tracks 206 and the different data bit 204 shapes are respectively accommodated by configuring the data reader 202 to maximize the amount of magnetic data bits grains concurrently facing the air bearing surface of the data reader 202 while the data reader 202 passes over the data bit 204.

FIG. 4A shows a first data bit shape 208 that is matched by orienting the data reader centerline 210 at a first angle $\Theta_1$ with respect to a first track centerline 212. The first angle $\Theta_1$ positions the data reader 202 to be entirely exposed to the data bit 202. In other words, the data reader 202 in FIG. 4A is completely contained within the areal extent of the first data bit shape 208 due to the skewed first reader angle $\Theta_1$, which optimizes SNR and data bit reading performance. It is noted that there can be large variations between data bits 204 and the optimized reader angle $\Theta_1$ can be chosen based on a plurality of read data bits 204 that are analyzed for bit error rate.

With data being written with increasing speed and different writing schemes, such as heat assisted magnetic recording (HAMR), microwave assisted magnetic recording (MAMR), and perpendicular magnetoresistive recording, the data bits can be have more of a stretched arrangement, such as the second data bit shape 214 of FIG. 4B. The second data bit shape 214 would provide a relatively small SNR if the data reader 202 was oriented at a normal orientation, such as parallel to the track centerline 212. In yet, skewing the data reader 202 to the second angle $\Theta_2$ positions more of the data bit 204 under the data reader 202 while the data reader 202 travels down a second data track 216 with a second track centerline 218 along the Y axis.

FIG. 4C shows a third 220 data bit shape that would be difficult to accurately read if the data reader centerline 210 was oriented parallel to the third track centerline 222 of the third data track 224. Skewing the data reader 202 to the third angle $\Theta_3$ brings more of the magnetic grains of the third data bit shape 216 under the data reader 202. The ability to accommodate a variety of different data bit shapes on different data tracks optimizes performance the data storage device 200 by increasing SNR. With a strong SNR provided by matching the data reader 202 orientation with the data bit shape, data reading errors are decreased and data reading pendency is reduced as less redundant reads are needed to accurately sense a data bit.

FIG. 5 is a flowchart of an example data reading routine 230 that may be carried out in accordance with various embodiments. The routine 230 begins by mapping the shape of one or more data bits stored on a data storage medium in step 232. The mapping of data bits can use predictive modeling and/or sensed SNR to identify the shape of data bit on the data storage medium. Although the data bits are partially obscured by shingled data tracks in some embodiments, routine 230 may be conducted in non-shingled data track environments.

Next, step 234 orients a data reader at a non-normal, such as any angle but 0°, 90°, and 180°, with respect to a data track centerline to match the shape of data bits on a first data track. The matching of the data reader angle with the shape of a data bit optimizes the SNR resulting from reading the first data bit in step 236. In other words, the non-normal angle of the data reader allows more data bit grains to concurrently be sensed by the data reader as the reader passes over the data bit. It is contemplated that there are large variation in data bits, which is accommodated by using a bit error rate (BER) of several read data bits as an indicator to determine the optimal data reader angle to provide a high SNR.

While it is noted that a single data bit can be read with routine 230, it is contemplated that a series of data bits on one or more data tracks are subsequently read. After a number of data bits of the first data track are read in step 236, decision 238 determines if the configuration of the data reader is to move. For example, if the angle or position of the data reader relative to the track centerline is to change to accommodate a second data track while the data storage medium is static or rotating. In the event no reader movement is called for, step 240 proceeds to read the next data track before returning to decision 238 to evaluate if future reader movement can optimize data bit reading. If the data reader is prompted to move, step 242 actuates the data reader with respect to the data track centerline of another selected data track prior to executing step 240 to read the next encountered data bit.

It is noted that the various aspects of routine 230 are merely exemplary and are not required or limiting. That is, any number of steps and decisions can be moved, changed, added, and omitted at will. For example, routine 230 may have one or more steps to skew a data writer relative to a track centerline to manipulate the data bit shape and the ability of a skewed data reader to provide high SNR.

Through the various embodiments that skew a data reader to match the shape of a data bit resident in shingled data tracks, data reading performance is optimized as data bit read signal is increased while unwanted noise is minimized by a majority of the exposed data bit being concurrently sensed by the skewed data reader. The ability to move the data reader's angle and position relative to a track centerline allows different data bit shapes on different data tracks to be accommodated and a high SNR to be maintained despite design and process variability inherent in fabrication and operation of a rotating data storage device. In addition, the skewed position of a data reader can allow a variety of different data writing schemes to be utilized to efficiently write large volumes of data.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:
1. An apparatus comprising:
   a plurality of data bits arranged in first and second shingled data tracks on a data storage medium;
   a data writer having a writer centerline aligned parallel with a track centerline of the first shingled data track, the writer centerline bisecting the data writer and extending through a symmetric center of the data writer; and a data reader having a reader centerline concurrently skewed in a non-parallel configuration with respect to the track and writer centerlines, the reader centerline bisecting the data reader and extending through a symmetric center of the data reader.

2. The apparatus of claim 1, wherein the data reader is skewed to match an angled portion of a data bit of the plurality of data bits.

3. The apparatus of claim 2, wherein the angled portion of the data bit is continuously curvilinear.

4. The apparatus of claim 2, wherein the angled portion of the data bit is present on an exposed side of the track centerline.

5. The apparatus of claim 1, wherein the track centerline continuously extends along a medial portion of the first shingled data track, the medial portion positioned equidistant from first and second data track edges.

6. The apparatus of claim 1, wherein the data reader is offset from the track centerline.

7. The apparatus of claim 1, wherein the first and second data tracks overlap to obscure a portion of the plurality of data bits on the first shingled data track.

8. The apparatus of claim 1, wherein the reader centerline is parallel to a transverse axis of the data reader and perpendicular to a longitudinal axis of the data reader.

9. The apparatus of claim 1, wherein the writer centerline is parallel to a transverse axis of the data reader and perpendicular to a longitudinal axis of the data reader.

10. The apparatus of claim 1, wherein the data writer and data reader respectively have first and second widths, each measured perpendicular to the track centerline, the first width being greater than the second width.

11. An apparatus comprising a transducing head separated from a data storage medium, the transducing head comprising a data writer and a first data reader, the data storage medium comprising a plurality of data bits arranged in first and second shingled data tracks, the data writer having a writer centerline aligned parallel with a track centerline of the first shingled data track, the writer centerline bisecting the data writer, oriented perpendicular to a longitudinal axis of the data writer, and extending through a symmetric center of the data writer, the first data reader having a first reader centerline concurrently skewed in a non-parallel configuration with respect to the track and writer centerlines, the reader centerline bisecting the first data reader, oriented perpendicular to a longitudinal axis of the data reader, and extending through a symmetric center of the first data reader.

12. The apparatus of claim 11, wherein the transducing head further comprises a second data reader having a second reader centerline skewed with respect to the writer and track centerlines, the second reader centerline bisecting the second data reader and extending through a symmetric center of the second data reader.

13. The apparatus of claim 12, wherein the first and second reader centerlines are parallel.

14. The apparatus of claim 12, wherein the first and second reader centerlines are oriented at different angles with respect to the track centerline.

15. The apparatus of claim 12, wherein the first data reader is positioned over a data bit on the first shingled data track while the second data reader is positioned over a data bit on the second shingled data track.

16. A method comprising:
positioning a transducing head separated from a data storage medium, the transducing head comprising a data writer and a data reader, the data storage medium comprising a plurality of data bits arranged in first and second shingled data tracks;
aligning a writer centerline of the data writer parallel with a track centerline of the first shingled data track, the writer centerline bisecting the data writer and extending through a symmetric center of the data writer; and
orienting a reader centerline of the data reader to a first skewed angle that is concurrently non-parallel with respect to the track and writer centerlines, the reader centerline bisecting the data reader along a transverse axis and extending through a symmetric center of data writer; and
altering the first skewed angle to a second skewed angle with respect to the track centerline in response to actuation of a heater mechanism.

17. The method of claim 16, wherein a controller provides a control signal to the heater mechanism to alter the first skewed angle.

18. The method of claim 16, wherein the first skewed angle is altered so that the data reader matches an angled portion of a data bit of the plurality of data bits.

19. The method of claim 16, wherein the altering step is completed while the plurality of data bits are being read by the data reader.

20. The method of claim 16, wherein the first and second skewed angles are each non-normal with respect to the track and writer centerlines.

* * * * *